No. 865,294. PATENTED SEPT. 3, 1907.
G. M. CLARK.
PLOWING MACHINE.
APPLICATION FILED JAN. 20, 1903.
2 SHEETS—SHEET 1.
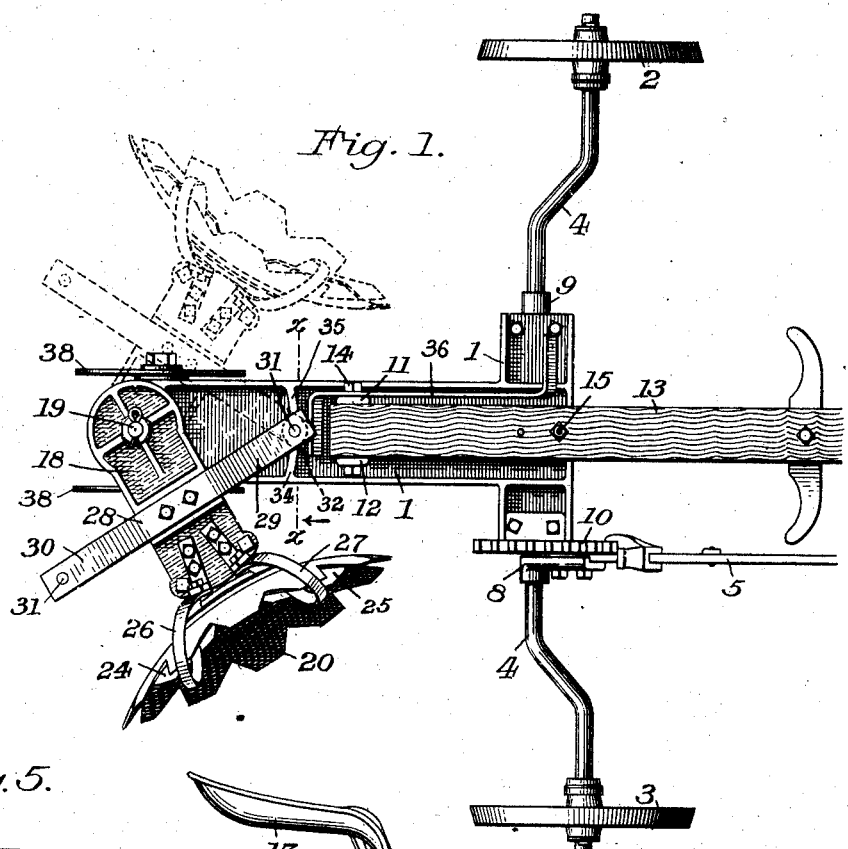
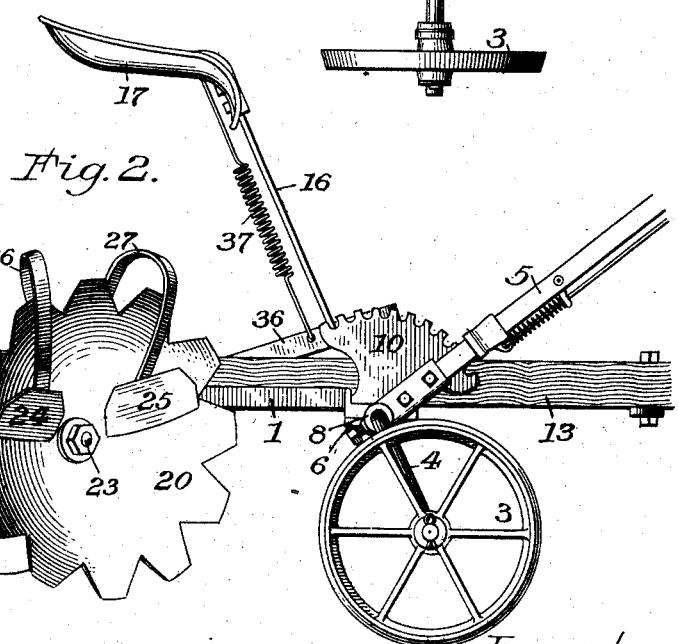
Attest:
A. W. Avery.
H. W. Eeeir
Inventor:
George Marshall Clark,
By Howell Bentle
Attorney.
THE NORRIS PETERS CO., WASHINGTON, D. C.

UNITED STATES PATENT OFFICE.

GEORGE MARSHALL CLARK, OF HIGGANUM, CONNECTICUT.

PLOWING-MACHINE.

No. 865,294.  Specification of Letters Patent.  Patented Sept. 3, 1907.

Application filed January 20, 1903. Serial No. 139,811.

*To all whom it may concern:*

Be it known that I, GEORGE MARSHALL CLARK, a citizen of the United States, residing at Higganum, in the county of Middlesex and State of Connecticut, have invented new and useful Improvements in Plowing-Machines, of which the following is a specification.

My invention relates to machines embodying a rotary plowshare in the form of a concavo-convex disk mounted on an axis which is oblique or inclined to the line of draft, and broadly stated my invention consists in so mounting the disk or plowshare that it may be swung in a practically horizontal plane rearwardly around its support for turning the concave side of the disk or plowshare towards the right or left of the line of draft, so that a furrow may be turned to the right or left as circumstances may require; the organization being such as to permit a reversal of the plowshare by movements of the draft team, as will be hereinafter described.

For a detail description of my invention, I will refer to the accompanying drawings in which,—

Figure 3:
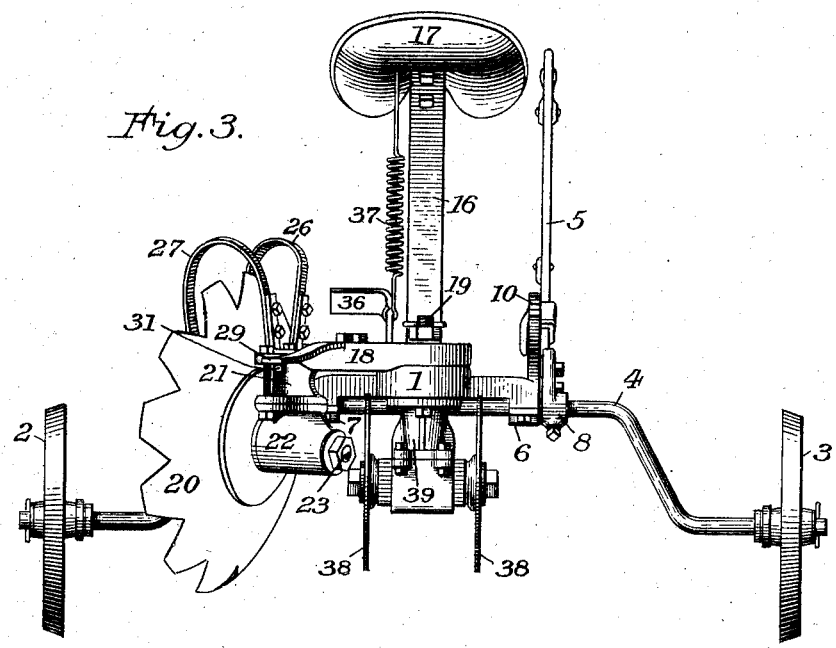
Figure 4:
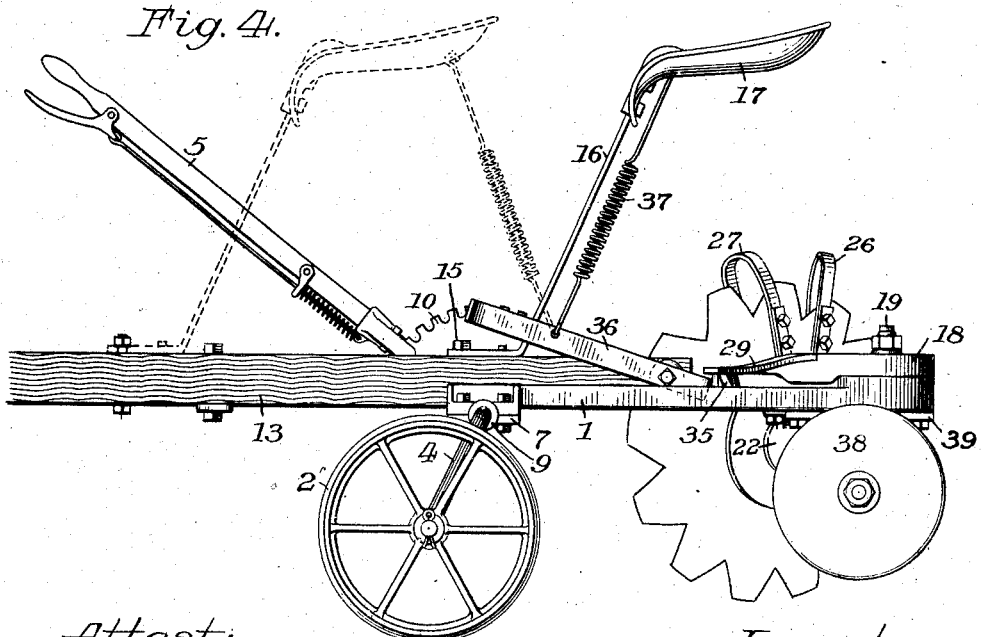

Figures 1 and 2, illustrate in plan and side views, respectively, a machine embodying my invention, the plowshare in said views being shown in position for turning a furrow towards the right hand side of the machine. Fig. 3, is a rear view of the machine with the plowshare in position for turning a furrow towards the left hand side of the machine. Fig. 4, is a view of the side of the machine opposite to that illustrated in Fig. 2, and Fig. 5, is a detail view taken on line x—x of Fig. 1.

The main frame 1 of the machine is preferably constructed of metal and may be made in any form best suited to the particular manner in which the plowshare is to be supported thereby; it being understood that while I have illustrated my invention in what I deem its best form, the details of construction may be infinitely varied without departure from the main features of my invention.

The front end of the main frame is provided with two carrying wheels 2 and 3 which are axially mounted on opposite ends of a pivotal bent axle 4 to which is firmly attached a controlling lever 5, the latter serving to rotate said axle for varying the relations between the axes of the wheels and the frame of the machine for raising or lowering the plowshare or wholly lifting it above the tread of the wheels as when moving the machine while out of service. The axle 4 is mounted in suitable bearings or boxes 6 and 7 on the underside of the main frame, and is held against lateral movement by the hub 8 of the lever 5 and by a collar 9 on the opposite side of the axle supports as clearly shown in Fig. 1.

Lever 5 is provided, as is usual, with a spring-actuated pawl which engages a segmental notched plate 10 for holding the axle to its adjusted position as will be readily understood.

To the rear of the axle 4 and on the top of the main frame are two ears or lugs 11 and 12 between which the rear end of the draft pole 13 is secured by means of a bolt 14, said pole being further secured to the main frame by a bolt 15 which also serves to secure the seat standard 16 upon which the driver's seat 17 is mounted.

At the rear end of the main frame there is a swinging arm 18 which is pivotally secured to said frame by a king bolt 19, said arm being capable of swinging from side to side around the rear end of said frame for reversing the plowshare 20 which is secured thereto. On the underside of the arm 18 is a standard or hanger 21 having at its lower end a journal box 22 in which is mounted the journal or spindle 23 of the rotary plowshare 20. Said plowshare is a concavo-convex disk preferably notched at its outer edge to afford intervening spade-like portions which are well sharpened at the edges, but a plain edge rotary disk may be relied upon for fairly good service. On the concave side of the disk there are two scrapers 24 and 25 which keep the disk free from adhering earth and also serve as mold boards to assist in turning the furrow, said scrapers being mounted on spring arms 26 and 27 which are secured to the swinging arm 18 as clearly shown.

The disk or plowshare 20 is mounted with its convex side towards the king bolt 19 so that when arm 18 is in the position illustrated in Fig. 1 the concave side of the disk will be towards the right hand side of the machine, and when said arm is swung around to the position indicated in dotted lines in said figure, the concave side of the disk will be towards the left hand side of the machine. The shifting of the plowshare from one position to the other is for the purpose of causing it to operate in turning a furrow to the right or to the left as circumstances may require. It will be obvious, however, that the plowshare must be held to the proper angle with respect to the line of draft, in order that it may properly perform its furrow turning duty. This may be accomplished in various ways, but I prefer to employ the means illustrated in the drawings.

Bolted on top of the pivoted arm 18 is a flat spring metal bar 28, the ends of which project beyond the sides of said arm to form projecting spring arms 29 and 30, both of which are provided on the underside with a bolt or pin 31. On top of the main frame there is a socket 32 formed in a boss 33 which is provided on opposite sides with inclines 34 and 35 as best shown in Fig. 5. The lower ends of these inclines are slightly below the plane of the pins 31 so that when the plowshare is moved to its proper position for turning a furrow to the right, the pin 31 on spring arm 29 will ride up the incline 34 and be forced by said arm into the socket 32 and thus lock the plowshare to its adjusted position. When the plowshare is reversed for turning a furrow to the left, the pin 31 on the spring arm 30 will ride up the incline 35 and be forced by said arm into the socket for locking the plowshare in its reversed position.

When the plowshare is to be reversed, the locking pin is raised out of the socket 32 by a foot lever 36 which is pivotally mounted on the bolt 14 that secures the rear end of the draft pole. The short arm of said lever is located in position to raise the spring arm 29 or 30 when the long arm of the lever is depressed by the foot of the operator. The long arm of said lever is held in its elevated position by a retractile spring 37 attached to said arm and to the driver's seat 17 as clearly shown.

The machine is provided with one or more flat rotary disks 38 which cut into the earth and hold the machine against the side thrust of the plowshare. Two of these disks are shown but one will be found to give satisfactory results. These disks are preferably mounted on a standard 39 attached to the rear end of the main frame, so that they will be directly in line with the side thrust of the plow.

When the machine is in service the plowshare and disks 38 are lowered by means of the lever 5 which is moved back for rotating the bent axle 4 and lowering the main frame as will be readily understood. After a furrow has been turned and it is desired to reverse the plowshare, the long arm of lever 36 is depressed by the foot of the operator to raise the locking pin 31 out of the socket 32. The machine is then moved forward a short distance, and the arm 18 being free to swing on the king bolt 19, the plowshare will assume the position indicated in dotted lines in Fig. 2. Then by turning the team towards the side to which the plowshare is to be moved, the main frame and arm 18 may be brought into proper relations to each other, for causing the proper locking pin 31 to enter the socket 32 and lock the plowshare in the desired position.

When the machine is to be moved while out of service, the plowshare is raised above the surface of the ground by means of the lever 5, and the seat standard is moved to the position indicated in dotted lines in Fig. 4. This being for the purpose of relieving the rear portion of the machine of weight of the driver or operator.

Having thus described my invention, what I claim as new and desire to secure by Letters Patent is,—

1. In a plowing machine, the combination of a wheel mounted frame, an arm pivotally secured thereto, a rotary plowshare mounted on said arm, the latter being adapted to be secured in a position forward of its pivotal support and thus support said plowshare in working position forward and to the one side of said pivotal support, and also adapted to swing rearwardly around said pivotal support to a corresponding position on the opposite side thereof for reversing the plowshare.

2. In a plowing machine, the combination of a wheel mounted frame, an arm pivotally secured thereto, a concavo-convex revolving disk mounted on said arm with its convex side facing the pivotal support of said arm, the latter being adapted to support said disk forward and to the one side of the pivotal support of said arm, and also adapted to swing rearwardly around said pivotal support to a corresponding position on the opposite side thereof for reversing the disk, and means for locking said arm in either of its positions of adjustment.

3. In a plowing machine, the combination of a wheel mounted frame, an arm pivotally secured thereto, a rotary plowshare mounted on said arm, the latter being adapted to be secured in a position forward of its pivotal support and thus support said plowshare forward and to the one side of said pivotal support, and also adapted to swing rearwardly around said pivotal support to a corresponding position on the opposite side thereof for reversing the plowshare, and a rotary disk supported by said frame and adapted to hold the machine against the side thrust of the plowshare.

4. In a plowing machine, the combination of a wheel mounted frame, an arm pivotally secured thereto, a rotary plowshare mounted on said arm, the latter being adapted to be secured in a position forward of its pivotal support and thus support said plowshare forward and to the one side of said pivotal support, and also adapted to swing rearwardly around said pivotal support to a corresponding position on the opposite side thereof for reversing the plowshare, and spring latching mechanism for locking said arm in either of its positions of adjustment.

5. In a plowing machine, the combination of a wheel mounted frame, a swinging arm pivotally mounted thereon and adapted to be swung in a horizontal plane from one side to the other of its pivotal support, spring arms projecting from opposite sides of said swinging arm, each of said spring arms being provided with a latching member, a coöperating latching member on said frame with which the latching members on said arms may alternately engage for holding the swinging arm on one side or the other of its pivotal support, and a rotary plowshare mounted on said arm and adapted to be reversed by the movements thereof for turning a furrow to the right or left of the line of draft, substantially as described.

6. In a plowing machine, the combination of a wheel mounted frame, a swinging arm pivotally mounted thereon and adapted to be swung in a horizontal plane from one side to the other of its pivotal support, spring arms projecting from opposite sides of said swinging arms, each of said spring arms being provided with a latching member, a coöperating latching member on the main frame with which the latching members on said spring arms may alternately engage for holding the swinging arm on one side or the other of its pivotal support, a rotary plowshare mounted on said arm and adapted to be reversed by the movements thereof for turning a furrow to the right or left of the line of draft, and a lever for raising said spring arms and releasing the latching members, substantially as described.

7. In a plowing machine, the combination of a wheel-mounted frame, an arm pivotally secured to said frame and adapted to swing around the rear end thereof, means for locking said arm in a forward position on either side of its pivotal support, a rotary plowshare carried by said arm and adapted to be reversed by the swinging movement of said arm for turning a furrow to the right or left of the line of draft, and a rotary disk mounted on said frame below said arm and substantially between the two reverse positions of the plowshare.

8. In a plowing machine, the combination of a wheel-mounted frame, a driver's seat mounted thereon, an arm pivotally secured to said frame and adapted to swing in a horizontal plane around the rear end thereof, spring latching mechanism for securing said arm in a position forward of its pivotal support on either side thereof, a rotary plowshare carried by said arm and adapted to be reversed by the swinging movement of said arm for turning a furrow to the right or left of the line of draft, and means for releasing said latching mechanism, said means being within reach of the operator seated upon said seat.

In testimony whereof I have hereunto set my hand in presence of two subscribing witnesses.

GEORGE MARSHALL CLARK.

Witnesses:
  ALBERT H. HUBBARD,
  CLEMENT S. HUBBARD.